US007340389B2

(12) United States Patent
Vargas

(10) Patent No.: US 7,340,389 B2
(45) Date of Patent: Mar. 4, 2008

(54) MULTILANGUAGE UI WITH LOCALIZED RESOURCES

(75) Inventor: Garrett R Vargas, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 875 days.

(21) Appl. No.: 09/784,246

(22) Filed: Feb. 16, 2001

(65) Prior Publication Data

US 2002/0116172 A1  Aug. 22, 2002

(51) Int. Cl.
*G06F 7/20* (2006.01)
*H04Q 7/20* (2006.01)
(52) U.S. Cl. .................. 704/8; 704/270; 455/456.3
(58) Field of Classification Search .............. 704/9, 704/8, 2, 7
See application file for complete search history.

(56) References Cited

U.S. PATENT DOCUMENTS

| | | | | |
|---|---|---|---|---|
| 5,339,240 | A | | 8/1994 | Beaverson ............. 364/419.14 |
| 5,442,782 | A | * | 8/1995 | Malatesta et al. ............... 707/4 |
| 5,596,698 | A | * | 1/1997 | Morgan ........................ 704/1 |
| 5,652,884 | A | | 7/1997 | Palevich ..................... 395/651 |
| 5,778,213 | A | * | 7/1998 | Shakib et al. ................. 703/27 |
| 5,835,912 | A | * | 11/1998 | Pet .............................. 704/2 |
| 5,873,087 | A | * | 2/1999 | Brosda et al. ............. 707/100 |
| 5,900,871 | A | * | 5/1999 | Atkin et al. .................... 704/8 |
| 5,907,326 | A | * | 5/1999 | Atkin et al. .................... 704/8 |
| 5,963,940 | A | * | 10/1999 | Liddy et al. .................... 704/9 |
| 6,081,803 | A | | 6/2000 | Ashby et al. .................. 707/4 |
| 6,085,098 | A | * | 7/2000 | Moon et al. ................. 455/457 |
| 6,185,729 | B1 | | 2/2001 | Watanabe et al. ............. 717/1 |
| 6,311,180 | B1 | * | 10/2001 | Fogarty ........................ 707/4 |
| 6,324,500 | B1 | * | 11/2001 | Amro et al. .................... 704/8 |
| 6,492,995 | B1 | * | 12/2002 | Atkin et al. ................. 715/703 |
| 6,529,728 | B1 | * | 3/2003 | Pfeffer et al. ............... 455/418 |
| 6,623,529 | B1 | * | 9/2003 | Lakritz ....................... 709/203 |
| 6,687,736 | B1 | * | 2/2004 | Lee ............................... 704/8 |
| 6,792,575 | B1 | * | 9/2004 | Samaniego et al. ......... 709/203 |
| 6,839,742 | B1 | * | 1/2005 | Dyer et al. .................. 709/217 |
| 6,865,716 | B1 | * | 3/2005 | Thurston ....................... 704/8 |
| 2002/0047831 | A1 | * | 4/2002 | Kim et al. ................... 345/168 |
| 2002/0119788 | A1 | * | 8/2002 | Parupudi et al. ............ 455/456 |

FOREIGN PATENT DOCUMENTS

WO  WO 02/23926 A2  3/2002

OTHER PUBLICATIONS

No Author—News Release: News of Supply Tech, Inc., 1000 Campus Drive, Ann Arbor, Michigan 48104, Sep. 12, 1994; NDN-125-0309-6123-0.

\* cited by examiner

*Primary Examiner*—Tālivaldis Ivars Šmits
(74) *Attorney, Agent, or Firm*—Merchant & Gould P.C.; Ryan T. Grace

(57) ABSTRACT

A multi-language user-interface (MUI) for use in a mobile electronic device accesses language-dependent information. The MUI system includes a display, an operating system, a localized data store, and an application. The MUI system is used in displaying information in a selected language on the mobile electronic device. The needed language-dependent information may be localized or include a portion that is localized. When the application needs to display localized language-dependent information (e.g., resource strings, settings stored in a registry, or file names), this information is obtained from the localized data store, which also contains language-dependent for all of the languages supported by the mobile electronic device.

47 Claims, 6 Drawing Sheets

| ACTUAL FILE NAME | ENGLISH 0409 | GERMAN 0497 | FRENCH 040C | . . |
|---|---|---|---|---|
| CLOCK.LNK | CLOCK | UHR | --- | . . |
| TASK.LNK | TASK | TASKS | TÁSKS | . . |
| . | . | . | . | |
| . | . | . | . | |
| . | . | . | . | |

[ HKLM\SOFTWARE\MICROSOFT\TIMEZONES\4\0409 ]
"DISPLAY" = "PACIFIC STANDARD TIME"

[ HKLM\SOFTWARE\MICROSOFT\TIMEZONES\4\0407 ]
"DISPLAY" = "PAZIFISCHER STANDARDZEIT"

MULTILANGUAGE UI WITH LOCALIZED RESOURCES

FIELD OF THE INVENTION

The present invention relates to mobile electronic devices and, more particularly, to a Multi-language User Interface (MUI) for use in a mobile electronic device. Still more particularly, the invention relates to extending an MUI system to use localized multi-language filenames and localized multi-language registry settings.

BACKGROUND OF THE INVENTION

Some types of portable electronic devices are processor-controlled, with a user interface to allow the user to more easily and intuitively operate the device. For example, mobile telephones are increasingly becoming more than just wireless voice communication devices. Rather, in addition to handling voice data, mobile telephones have a display unit to display graphical data to support email, web browser, and other non-voice features. Still further, such mobile electronics devices are very popular worldwide, with a number of manufacturers making and selling these devices in a price competitive environment. Thus, these mobile electronic devices are generally manufactured in large volumes to be sold in various countries. In order to reduce costs, manufacturers of such mobile electronic devices often desire a single manufacturing process that produces devices that can be sold in multiple countries without the need for special customizing steps.

SUMMARY OF THE INVENTION

In accordance with the present invention, an MUI that can access localized information is provided for use in a mobile electronic device. In one aspect of the present invention, the MU system displays localized information (e.g., settings stored in a registry) in a selected language on the portable electronic device. In one embodiment, the MUI system includes a display, an operating system, a localized data store, and an application. When the application needs to display language-dependent information, this information is obtained from the localized data store, which contains language-dependent information for all of the languages supported by the mobile electronic device. This aspect advantageously allows for access to localized language-dependent information, which was heretofore unavailable in mobile electronic devices without rewriting each application that might have a need for this information.

In a further refinement of this aspect of the present invention, the MUI system also includes alternative resources. The alternative resources include language-dependent information for each language supported by the mobile electronic device. The application may need to display language-dependent information that can be non-localized, localized or both. Non-localized language-dependent information is obtained from the appropriate alternative resource. Localized language-dependent information is obtained as described above.

In another aspect of the present invention, the localized data store can also contain information in the registry. In a further refinement, the registry includes a base key for the requested type of localized information, with several sub keys, each corresponding to the localized information in one of the languages supported by the mobile electronic device. That is, each sub key is associated with a different language and contains the localized information in that particular language. When an application (such as a display form or dialog box) makes a call to the registry to return the localized setting, if the localized setting does not appear at the base registry key, the MUI system identifies the current language set for the system, and looks for a sub key that matches the current language. The MUI system then returns the setting in the appropriate language from the appropriate sub key to the calling application. In this way, the MUI system has a mechanism to access localized information and display it in an appropriate language.

In another aspect, the MUI system maintains a database of registered filenames with associated translations of those filenames into other possible languages. When a calling application queries for the name of a registered file, the MUI system identifies the current language setting and retrieves, from the database, the name of the file in the appropriate language.

DETAILED DESCRIPTION OF THE PREFERRED EMBODIMENT

Illustrative Mobile Electronic Device

Figure 1:
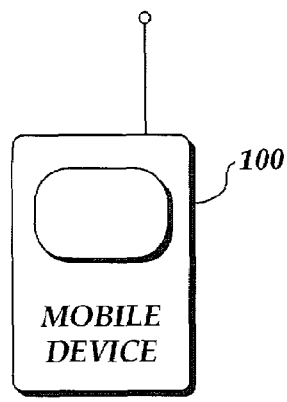
FIG. 1 is a diagram illustrating a perspective view of an exemplary mobile electronic device.

FIG. 1 illustrates a mobile electronic device 100, which in this example is a mobile telephone (e.g., a "cell phone"). Other examples of a mobile electronic device include personal digital assistants (PDAs), notebook computers, etc that include a processor or controller that operate under software or firmware control. Such mobile electronic devices may include a multi-language user interface (MUI) so that the mobile electronic device can be manufactured in one location and sold in many different countries without the need of additional steps to customize devices for a particular language.

One MUI provides a mechanism for supporting multiple language information in a single binary image. The MUI includes a dynamically linked library or library for each language that is supported. Although this MUI provides a relatively straightforward mechanism for supporting multiple languages on the device, this MUI cannot handle all localized information, such as registry settings. For example, the time zone name is stored as a localized setting in the registry because time zone names can be different from computer to computer since users may be located in different countries. That is, the time zone names are stored as a localized string in the registry because the value may change for a variety of reasons (e.g., a country may change a time zone boundary, change or create a time zone name for political reasons, or adopt or cancel daylight savings time). Because this MUI cannot handle localized information, it cannot properly display the time zone in the appropriate language.

Illustrative Hardware Implementation

Figure 2:
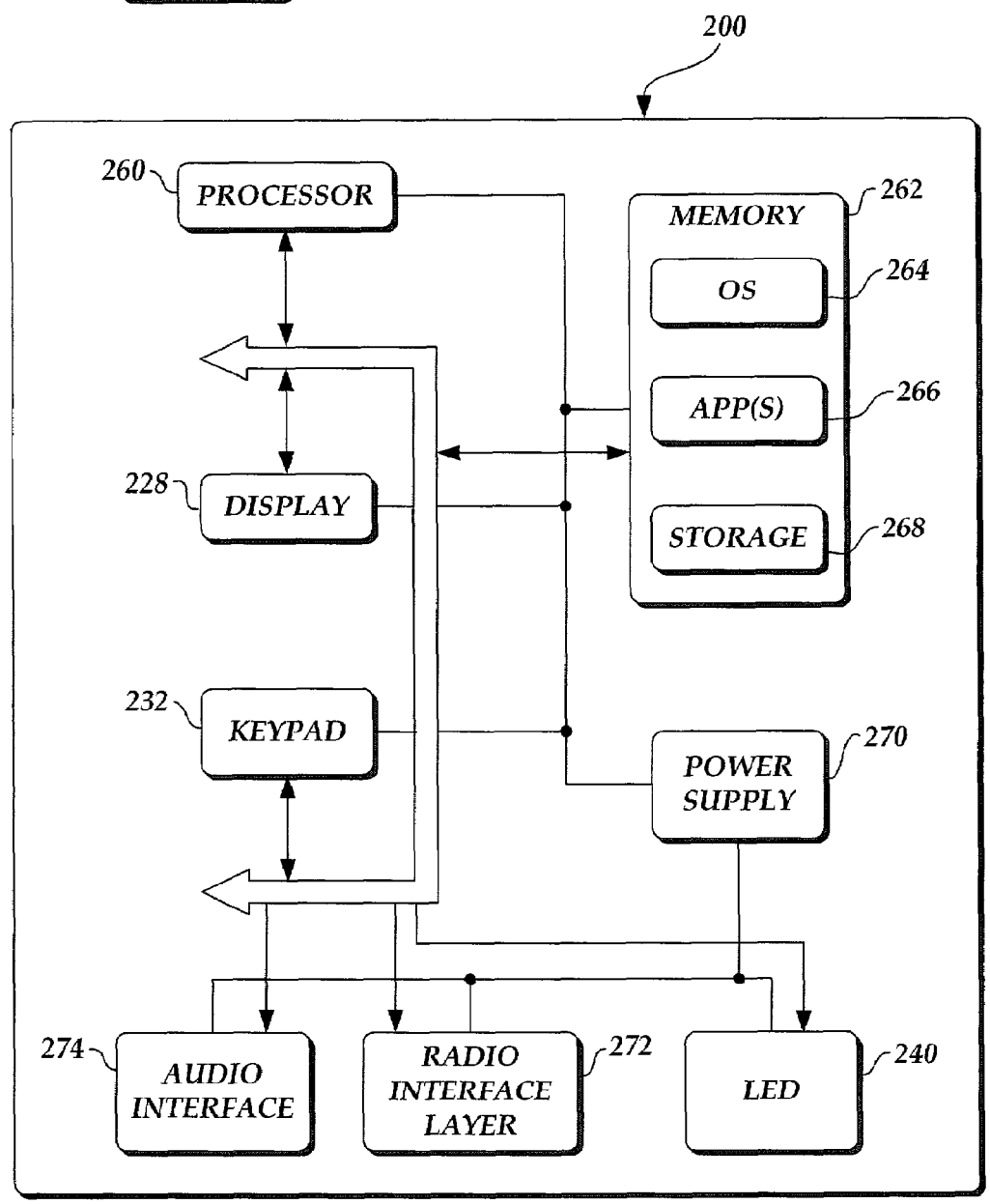
FIG. 2 is a block diagram illustrating components of an exemplary mobile electronic device, according to one embodiment of the present invention.

FIG. 2 is a functional block diagram illustrating functional components of a mobile electronic device 200. The mobile electronic device 200 has a processor 260, a memory 262, a display 228, and a keypad 232. The memory 262 generally includes both volatile memory (e.g., RAM) and non-volatile memory (e.g., ROM, Flash Memory, or the like). The mobile electronic device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile electronic devices. The display 228 may be touch-sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. The mobile electronic device 200 also includes non-volatile storage 268 within the memory 262. The non-volatile storage 268 may be used to store persistent information which should not be lost if the mobile electronic device 200 is powered down. The applications 266 may use and store information in the storage 268, such as e-mail or other messages used by an e-mail application, contact information used by a PIM, appointment information used by a scheduling program, documents used by a word processing application, and the like.

The mobile electronic device 200 has a power supply 270, which may be implemented as one or more batteries. The power supply 270 might further include an external power source, such as an AC adapter or a powered docking cradle that supplements or recharges the batteries.

The mobile electronic device 200 is also shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile electronic device 200 also includes a radio interface layer 272 that performs the function of transmitting and receiving radio frequency communications. The radio interface layer 272 facilitates wireless connectivity between the mobile electronic device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

Illustrative MUI System

Figures 3, 9:
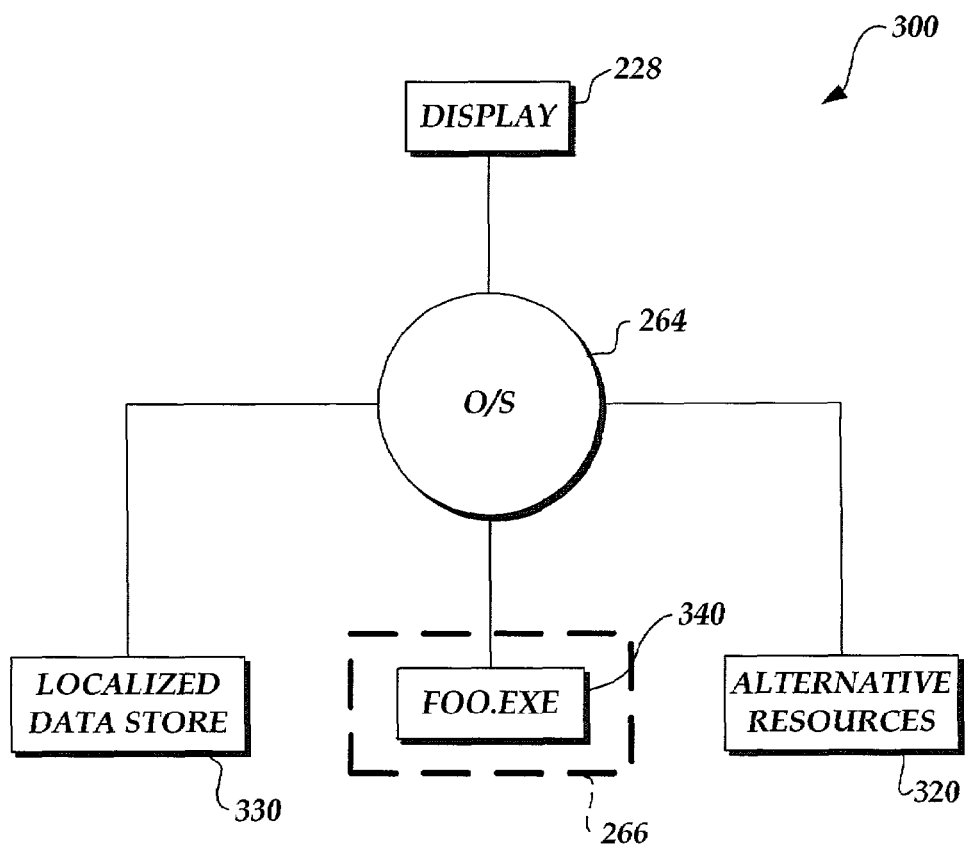
FIG. 3 is a block diagram illustrating components of a multi-language user interface (MUI), according to one embodiment of the present invention.
FIG. 9 is a diagram illustrating the organization of a localized multi-language filename data store, according to one embodiment of the present invention.

FIG. 3 is a block diagram illustrating components of a multi-language user interface (MUI) system 300, according to one embodiment of the present invention. The MUI system 300 includes alternative resources 320, a localized data store 330, and an application 340, illustrated as FOO.exe in this exemplary embodiment. In this embodiment, the localized data store 330 and the alternative resources 320 are stored in the storage 268 (FIG. 2), and the application 340 is part of the applications 266. In addition, the MUI system 300 incorporates the display 228 and the operating system 264. The display 228, the operating system 264 and the applications 266 have been previously described in conjunction with FIG. 2.

In this embodiment, the alternative resources 320 include non-localized resources in the various supported languages, which can be called by the application 340. Non-localized resources include UI related information which does not need to be changed from mobile device to mobile device, and thus can be similar among many mobile devices. While at the factory, the alternative resources 320 can include language libraries for the languages in all of the countries that the mobile electronic device 100 may be shipped. This system can advantageously simplify the manufacturing process, thereby reducing manufacturing costs.

The localized data store 330 is used to store localized information in the various supported languages. That is, the localized data store 330 stores UI-related information that may change from mobile device to mobile device. For example, if the country in which the user resides changes the name of the time zone, the user can update a setting (e.g., in the registry) in the localized data store 330 with the new time zone name.

The application 340 can be any application that has use for language dependent information, typically text. For example, the application 340 may display the current time zone in a dialog box. The application 340 can then access the needed language-based information from both the alternative resources 320 for the non-localized portion of the dialog and the localized data store 330 for the localized portion of the dialog. As previously discussed, localized language-dependent information was not accessible by the MUI prior to the present invention.

Illustrative Localized Multi-Language Access Method

Figure 4:
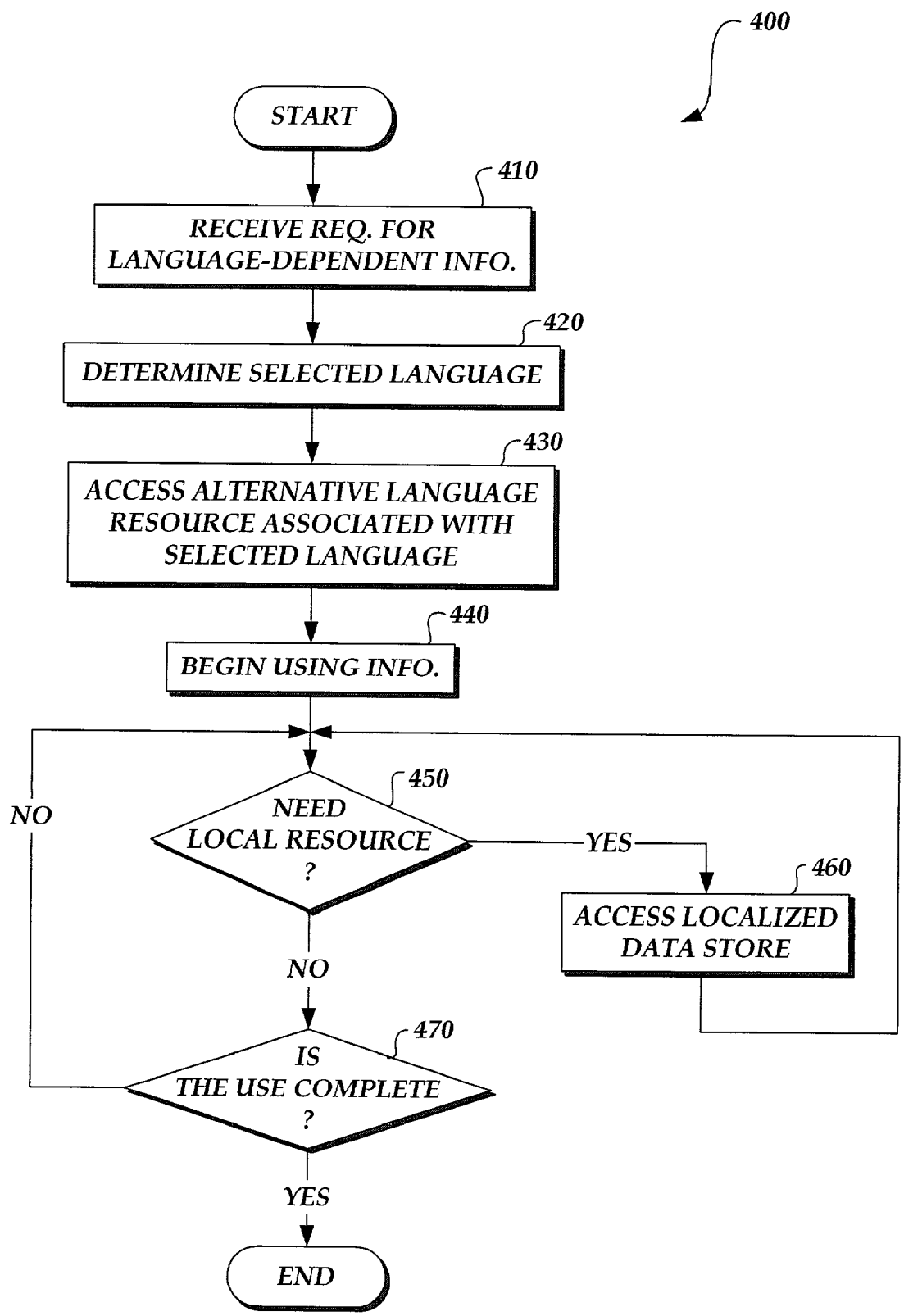
FIG. 4 is a flow diagram illustrating an operation of an MUI, according to one embodiment of the present invention.

FIG. 4 is a flow diagram illustrating a method 400 for use by an MUI (e.g., the MUI system 300 of FIG. 3) to access localized language information, according to one embodiment of the present invention. With the application 340 (FIG. 3) running, the method 400 begins at block 410 in which a request is received from the application 340 to access language-dependent information. For example, the application 340 could request text in a particular language (e.g., French) that is to be displayed on the display 228 (FIG.

3) in conjunction with rendering a dialog box or other UI-related object. In one embodiment, the application 340 sends the request to the operating system 264 for the needed language-dependent information. In other embodiments, the UI-related may be configured to display information in a form other than a dialog box. For example, the information can be displayed in the form of a picture, an audio signal, or a video signal.

The method 400 determines the language setting of the mobile electronic device 100 (FIG. 1) at block 420. In one embodiment, the user has already programmed the language setting in the mobile electronic device 100, which the operating system 264 can retrieve. The operating system may retrieve the language setting either after receiving the request or before. For example, the operating system may retrieve this information during the initialization process when the mobile electronic device is powered-up. Thus, although block 420 is shown following block 410, block 420 may already have been performed when the mobile electronic device 100 was turned on.

At a block 430, the method 400 accesses a resource to retrieve any non-localized data needed by the object being rendered. In one embodiment, the operating system 264 accesses the alternative resource 320 (FIG. 3). For example, the application 340 may need a particular string of text in French to render on the display 228. This string would be non-localized information stored in the alternative resource 320, along with similar strings of text in the other supported languages.

At a block 440, the method 400 begins rendering the UI object with the language-dependent information. In one embodiment, the operating system 264 begins providing information to the display 228 so that the language-dependent information can be displayed. Continuing the French language example, the operating system passes the language-dependent information to the UI object in preparation for it to "paint" itself on the display 228 with French text retrieved from the alternative resources 320.

At a decision block 450, the method 400 determines whether localized language-dependent information is needed during the use of block 440. Continuing the French language example, the UI object may need a string of French text that is stored in localized data store 330 (FIG. 3).

At a block 460, the localized language-dependent data is retrieved from the localized data store 330. In one embodiment, the operating system 264 performs this operation. For example, the operating system 264 accesses the localized data source 330 and retrieves the localized information (in French).

The method 400 then returns to continue the operation that was using the language-dependent information (e.g., painting the display with French text). If no localized information is needed, the method 400 determines at a decision block 470 whether the operation that was using the language-dependent information is complete. If the operation is complete, the method 400 ends; otherwise, the method 400 returns to continue the operation that was using the language-dependent information. By implementing the method 400, existing applications running on the mobile electronic device 100 can advantageously access localized language-dependent information without having to be rewritten.

Illustrative MUI with Localized Information in the Registry

Figure 5:
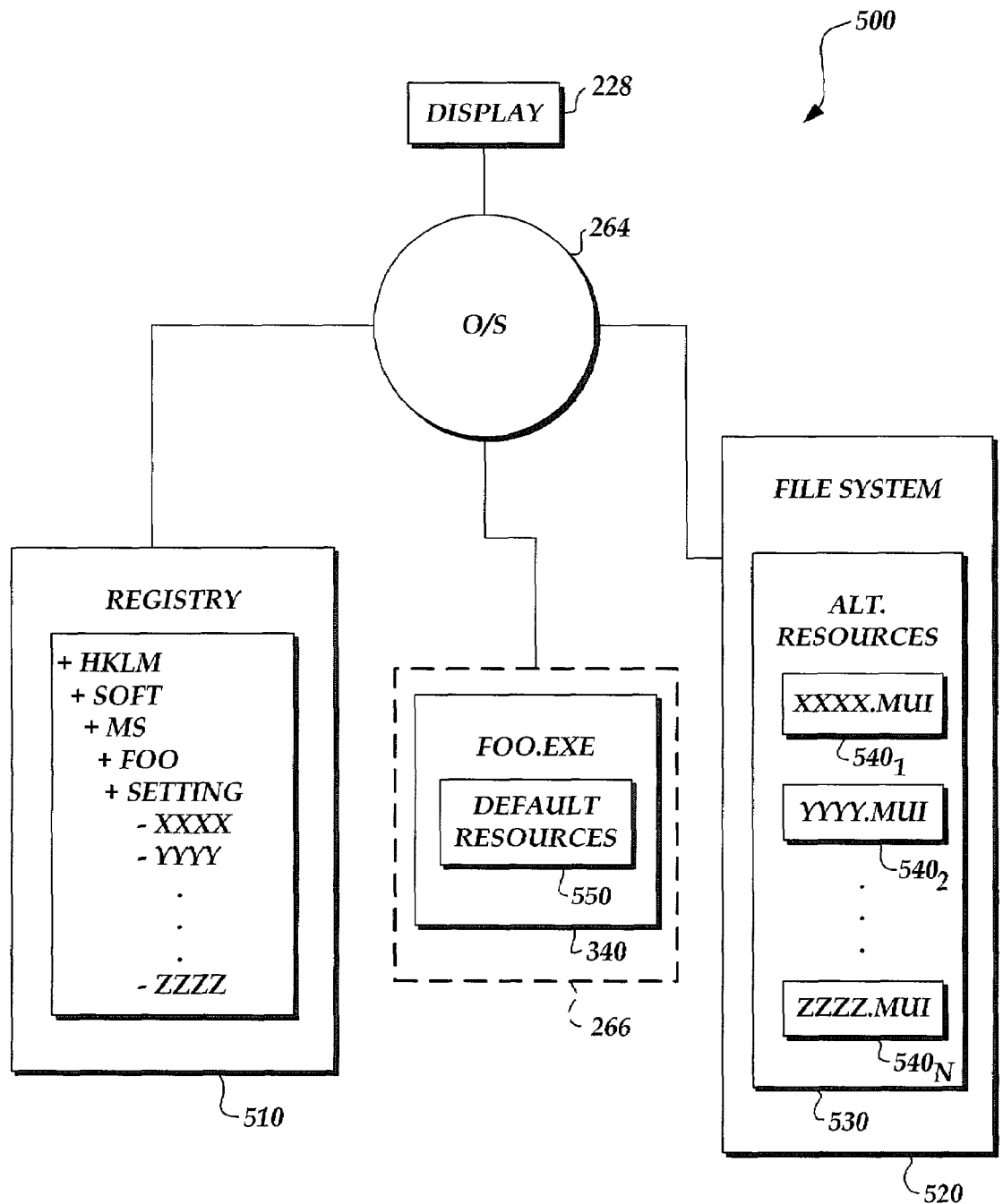
FIG. 5 is a block diagram illustrating components of a registry-accessible MUI, according to one embodiment of the present invention.

FIG. 5 is a functional block diagram illustrating functional components of a registry-accessible MUI system 500, according to one embodiment of the present invention. The MUI system 500 represents a specific implementation of the MUI system 300 (FIG. 3); namely, one in which the registry 510 implements the local data store 330 (FIG. 3), and in which the alternative resources 320 (FIG. 3) are implemented in the file system 520. In this example, the file system 520 includes alternate resources 530 that have language libraries $540_1, 540_2, \ldots 540_N$ (N being a positive integer) corresponding to the N languages supported by the mobile electronic device 100 (FIG. 1). In this implementation, the registry and file system are part of a Windows® type operating system. In accordance with the present invention, the registry 510 and the file system 520 are modified to include the localized language-dependent information and the non-localized language-dependent information, respectively, for languages supported by the mobile electronic device 100. The application 340 also includes default resources 550 which are used for non-localized resources for a default language. For example, if the application is installed on mobile devices that are most likely to be delivered to one country, the default resources may support the most common language used in that country. The display 228 and the operating system 264 have been previously described.

Illustrative MUI/Registry Access Method

Figure 6:
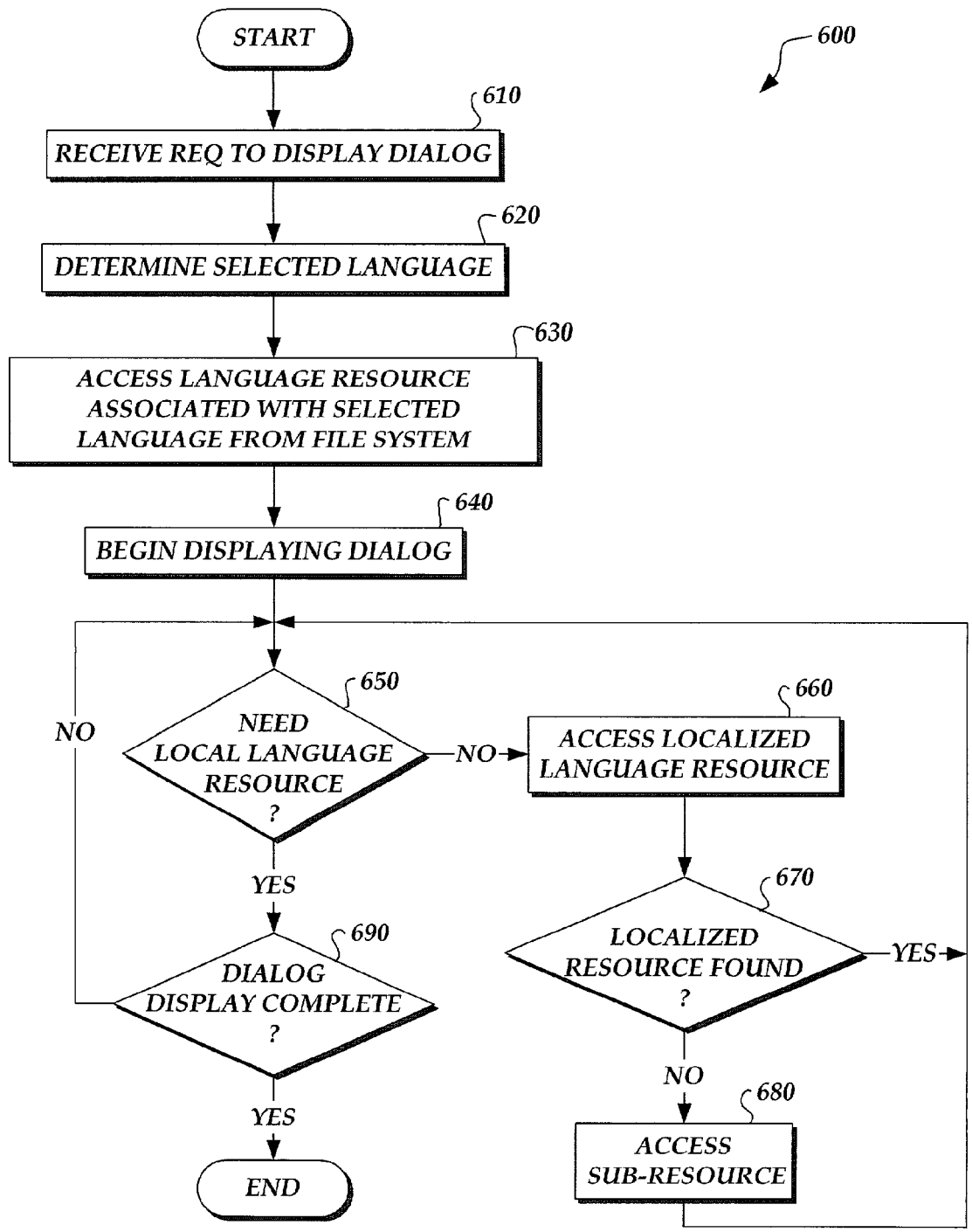
FIG. 6 is a flow diagram illustrating a registry access operation, according to one embodiment of the present invention.

FIG. 6 is a flow diagram illustrating an exemplary method 600 for use by an MUI (e.g., the MUI system 500 of FIG. 5) to access localized language information, according to one embodiment of the present invention. The method 600 is analogous to the method 400 (FIG. 4), with the method 600 being directed to a particular exemplary use (i.e., displaying a dialog box with localized language-dependent information accessed from the registry). In light of this disclosure, those skilled in the art can particularize the method 400 to display language-dependent information in other uses, without undue experimentation. Using the components described in FIG. 5, the method 600 is performed as follows.

With the application 340 (FIG. 5) running, the method 600 begins at block 610 in which a request is received from the application 340 to access language-dependent information to be displayed in a dialog box. For example, the application 340 could request text in German that is to be displayed in the dialog box. In one embodiment, the application 340 sends the request to the operating system 264 for the needed language-dependent information.

The method 600 determines the language setting of the mobile electronic device 100 (FIG. 1) at block 620. In one embodiment, the user or manufacturer has already programmed the language setting in the mobile electronic device 100, which the operating system 264 can then retrieve. For example, the operating system 264 may retrieve this information from the registry 510 during an initialization process when the mobile electronic device is powered-up. Thus, although block 620 is shown following block 610, block 620 may already have been performed when the mobile electronic device 100 was turned on.

At a block 630, the method 600 accesses the file system 520. For example, the application 340 may need a particular string (or strings) of text in German to display in the dialog box. This string would be non-localized information stored in the file system 520 in the "German" language library (say, for example, the library $540_2$ of FIG. 5) in the alternative resources 530. In one embodiment, the operating system 264 retrieves the German language information from the German language library.

At a block 640, the method 600 begins using the language-dependent information in displaying the dialog box. Continuing the German language example, in one embodiment, the operating system 264 passes to the dialog box the German text retrieved from the German language library in the file system 520.

At a decision block 650, the method 600 determines whether localized language-dependent information is needed during the display of the dialog box. Continuing the German language example, the dialog box may need the name of the local time zone, which would be stored in registry 510 (FIG. 5). In one embodiment, the dialog box requests the operating system 264 to provide this localized language information. In this example, the operating system 264 may then retrieve the location of the localized information from the application 340. In this embodiment, the application 340 returns a registry key.

At a block 660, the operating system 264 attempts to access the registry 510 at the registry key retrieved in block 650 to retrieve the localized language-dependent information (e.g., the local time zone in German text). At decision block 670, the method 600 determines whether the requested localized information is at the registry key.

If the localized information is found, the operating system 264 returns the localized information to the dialog box to be displayed. Conversely, if the localized information is not found, at block 680, the method 600 looks for the information in a sub key. The absence of the localized information at the identified registry key indicates to the operating system that the information is language-specific, and hence stored in an alternate location. In one embodiment, the operating system 264, not finding the requested localized information, uses the key plus the language setting to search for the desired localized information in the registry. That is, the registry is organized in a hierarchical structure. In this instance, the key has sub keys indexed by language. In this exemplary embodiment, the operating system 264 would then return the localized language-dependent information to the dialog box, which then continues rendering the dialog box with German text.

If at decision block 650 no localized information is needed, the method 600 determines at a decision block 690 whether the rendering operation being performed by the dialog object is complete. If the operation is complete, the method 600 ends; otherwise, the method 600 returns to continue the operation.

Figures 7A, 7B, 8:
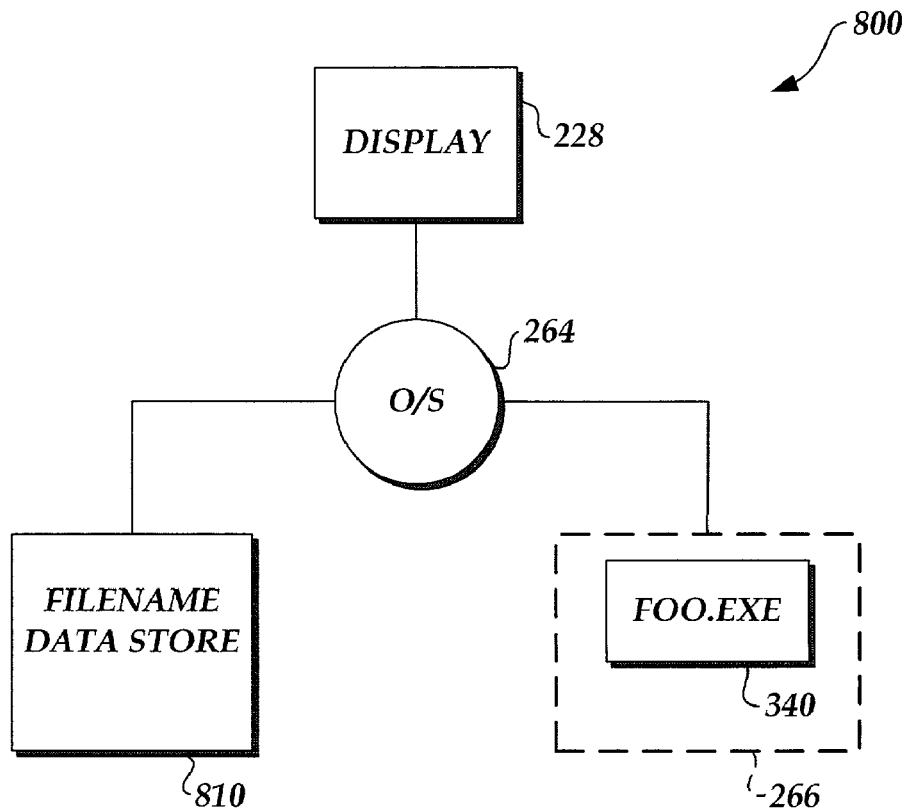
FIGS. 7A and 7B are diagrams illustrating the organization of a multi-language component of a registry, according to one embodiment of the present invention.
FIG. 8 is a block diagram illustrating functional components of a localized multi-language filename-accessible MUI, according to one embodiment of the present invention.

FIGS. 7A and 7B illustrate the organization of a multi-language component of a registry, according to one embodiment of the present invention. In particular, FIGS. 7A and 7B represent exemplary registry paths for localized language-dependent information. In these examples, the registry paths define the location of localized information related to the time zone, with the "4" indicating the Pacific Standard Time zone. In existing systems, the registry path would generally stop at the particular time zone (i.e., HKLM\SOFTWARE\MS\TIME ZONE\4). Thus, a call to this registry key would only be able to return one string (typically, "Pacific Standard" in English). In contrast, according to the present invention, sub keys are added to this key for each of the supported languages. For example, as shown in FIG. 7A, the "0409" sub key is added, which indicates the English language. As shown in FIG. 7B, the "0407" sub key is added, which indicates the German language. A call to the "0409" sub key would return the string "Pacific Standard Time", whereas a call to the "0407" sub key would return the string "Pazifischer Standardzeit" (i.e., a German name for pacific standard time). Optionally, the sub key can be cached after it is read to be readily available if it is needed again.

In a further refinement, the user can store localized information at the base key, which will then be returned by the method 600 as previously described. In effect, the user's change will preempt the localized settings in the sub keys. For example, the user can load a string, "Microsoft Time" in the base key, which results in the operating system 264 returning "Microsoft Time" instead of the string in the sub key. If a user stored the localized information in the base key, it is assumed that the information will be in the appropriate language.

Illustrative MUI with Localized Filename Information

FIG. 8 is a block diagram illustrating functional components of a MUI system 800 that supports localized multi-language filename access, according to one embodiment of the present invention. The MUI system 800 represents a specific implementation of the MUI system 300 (FIG. 3); namely, one in which a filename data store 810 implements the local data store 330 (FIG. 3). In this embodiment, the alternative resources 320 (FIG. 3) are not used and so are omitted from FIG. 8 for clarity. The filename data store 810 maintains a database of registered filenames with associated translations of those filenames into other languages supported in the mobile electronic device 100 (FIG. 1), which may be needed by the application 340. For example, the application 340 may need to display a filename in a dialog box, or to display the filename in a shortcut (also referred to as a link name). In a manner similar to that described above in conjunction with FIG. 4, when the application 340 queries for the name of the registered file, the MUI system 800 identifies the current language setting and retrieves the name of the file in the appropriate language from the filename data store 810. The filename data store 810 may be implemented as a look-up table, indexed by the actual filename of the registered file.

In one embodiment, the MUI system 800 operates as follows in painting a dialog box on the display 228. The application 340 calls a dialog object to begin painting dialog on the display 228 in the language of the current language setting. When the dialog object needs the filename of a registered file, the dialog object makes a call for the filename, which is handled by the operating system 264. The operating system 264 determines the language setting (this step may have been performed during power up), and makes a call with the actual filename of the registered file and the language setting to the filename data store 810. The filename data store 810 returns a string (i.e., the filename in the selected language) to the operating system 264. The operating system 264 then returns this filename string to the dialog object. The dialog object then paints the filename string on the display 228.

FIG. 9 is a diagram illustrating the organization of the filename data store 810, according to one embodiment of the present invention. In this embodiment, the filename data store 810 is implemented as a look-up table, indexed by actual file names of registered files, with entries for the filenames in English, German, French, etc. In this exemplary embodiment, the actual files names are link files such as clock.lnk, task.lnk, etc. The entries of the look-up table include the name of the file in various languages. Fields in the look-up table implementing filename data store 810 can be left unfilled, in which case a default name can be used (e.g., the actual filename). In this embodiment, the filename data store 810 is public, which allows the vendor of each application to load translations of the actual file name in the appropriate fields of the filename data store 810. This would typically be done when the application is installed in the mobile electronic device 100 (FIG. 1).

The above specification, examples and data provide a complete description of the manufacture and use of the composition of the invention. Since many embodiments of the invention can be made out departing from the spirit and scope of the invention, the invention resides in the claims hereinafter appended.

I claim:

1. A method for configuring a multi-language mobile device to accommodate data variances among geographic locations, the method comprising:

configuring the multi-language mobile device to include a language resource data store on the multi-language mobile device, wherein the language resource data store includes a first group of non-localized language-dependent elements for viewing an application in a first language and a second group of non-localized language-dependent elements for viewing an application in a second language, the second language being different than the first language;

configuring the multi-language mobile device to include a geographical resource data store on the multi-language mobile device, wherein the geographical resource data store includes geographically dependent elements for association with the application to update the application for a geographic location;

processing a request from an application to retrieve geographically dependent elements;

providing requested geographically dependent elements from the geographic resource data store to the application; and displaying the geographically dependent elements on the multi-language mobile device.

2. The method of claim 1, further comprising processing a second request to access the language resource data store, the language resource data store including the language-dependent elements for viewing the application in the first language, the language resource data store having a plurality of language-dependent elements, each language-dependent element being associated with a uniquely identified language.

3. The method of claim 2, wherein the language resource data store comprises a dynamically linked library.

4. The method of claim 1, further comprising determining a language setting of the multi-language mobile device.

5. The method of claim 1, wherein the geographical resource data store is organized hierarchically with a plurality of levels.

6. The method of claim 5, wherein processing the request further comprises accessing a level of the geographical resource data store to retrieve the requested geographically-dependent element.

7. The method of claim 6, further comprising accessing another level hierarchically below the level when the requested geographically-dependent element is not found in the level.

8. The method of claim 1, wherein the geographical resource data store comprises a look-up table.

9. The method of claim 1, wherein the geographically dependent element is a file name formatted in the first language.

10. The method of claim 9, wherein the geographical resource data store is accessible by an application to load the file name into the application.

11. A computer-readable medium having computer-executable instructions for configuring a multi-language mobile device to accommodate data variances among geographic locations, the instructions comprising:

configuring the multi-language mobile device to include a language resource data store on the multi-language mobile device, wherein the language resource data store includes a first group of non-localized language-dependent elements for viewing an application in a first language and a second group of non-localized language-dependent elements for viewing an application in a second language, the second language being different than the first language;

configuring the multi-language mobile device to include a geographical resource data store on the multi-language mobile device, wherein the geographical resource data store includes geographically dependent elements for association with an application to update the application for a geographic location;

processing a request from the application to retrieve geographically dependent elements;

providing requested geographically dependent elements from the geographic resource data store to the application; and displaying the geographically dependent elements on the multi-language mobile device.

12. The computer-readable medium of claim 11, further comprising processing a second request to access the language resource data store, the language resource data store including the language-dependent elements for viewing the application in the first language, the language resource data store having a plurality of language-dependent elements, each language-dependent element being associated with a uniquely identified language.

13. The computer-readable medium of claim 12, wherein the language resource data store comprises a dynamically linked library.

14. The computer-readable medium of claim 11, further comprising determining a language setting of the multi-language mobile device.

15. The computer-readable medium of claim 11, wherein the geographical resource data store is organized hierarchically with a plurality of levels.

16. The computer-readable medium of claim 15, wherein processing the request further comprises accessing a level of the geographical resource data store to retrieve the requested geographically-dependent element.

17. The computer-readable medium of claim 16, further comprising accessing another level hierarchically below the level when the requested geographically-dependent element is not found in the level.

18. The computer-readable medium of claim 11, wherein the geographical resource data store comprises a look-up table.

19. The computer-readable medium of claim 11, wherein the geographically dependent element is a file name formatted in the first language.

20. The computer-readable medium of claim 19, wherein the geographical resource data store is accessible by the application to load the file name into the application.

21. A multi-language mobile electronic device, comprising:

a geographic resource data store means on the multi-language mobile electronic device for storing geographically dependent elements for a plurality of geographic locations, wherein the geographically dependent elements are stored for association with an application of the multi-language mobile electronic device to update the application for a geographic location;

means for processing a request from the application to retrieve geographically-dependent elements from the geographic resource data store means;

a language resource data store means on the multi-language mobile electronic device for storing language-dependent elements for viewing the application in a first and second language, the language resource data store means having a plurality of language-dependent elements, each language-dependent element being associated with a uniquely identified language;

means for displaying information; and means for providing requested geographically-dependent elements from the geographic resource data store means to the application to be displayed.

22. The multi-language mobile electronic device of claim 21, further comprising:

means for processing a second request to access the language resource data store means.

23. The multi-language mobile electronic device of claim 21, further comprising means for determining a language setting of the mobile electronic device.

24. The multi-language mobile electronic device of claim 21, wherein the geographic resource data store means is organized hierarchically with a plurality of levels.

25. The multi-language mobile electronic device of claim 24, wherein the means for processing the request further comprises means for accessing a level of the geographic resource data store means to retrieve the requested geographically-dependent elements.

26. The multi-language mobile electronic device of claim 25, wherein the means for accessing is configured to access another level that is hierarchically below the level when the requested geographically-dependent elements are not found in the level.

27. The multi-language mobile electronic device of claim 21, wherein the geographic resource data store means comprises a registry.

28. The multi-language mobile electronic device of claim 21, wherein the geographic resource data store means comprises a look-up table.

29. The multi-language mobile electronic device of claim 21, wherein the geographically-dependent element comprises a file name formatted in the first language.

30. The multi-language mobile electronic device of claim 29, wherein the geographic resource data store means is accessible by an application to load the file name into the application.

31. A system for configuring a multi-language mobile device to accommodate data variances of geographical regions, comprising:

a display unit;

a language resource data store on the multi-language mobile device, wherein the language resource data store is configured to store a first group of language-dependent elements for viewing an application in a first language and a second group of language-dependent elements for viewing the application in a second language, the second language being different than the first language;

a geographical resource data store on the multi-language mobile device, wherein the geographical resource data store is configured to store geographically-dependent elements for association with an application to update the application for a geographic location;

an application associated with the multi-language mobile device; and an operating system coupled to the display, the geographical resource data store, and the application, wherein the operating system is configured to process a request from the application to retrieve geographically-dependent elements from the geographical resource data store, provide requested geographically-dependent elements from the geographical resource data store to the application, and cause the display unit to display the geographically-dependent elements.

32. The system of claim 31, wherein the language resource data store includes a plurality of language-dependent elements, each of the language-dependent elements being associated with a uniquely identifier language, wherein the operating system is configured to process a second request from the application to access the language resource data store.

33. The system of claim 32, wherein the language resource data store comprises a dynamically linked library.

34. The system of claim 31, wherein the operating system is further configured to determine a language setting of the multi-language mobile device.

35. The system of claim 31, wherein the geographical resource data store is organized hierarchically with a plurality of levels.

36. The system of claim 31, wherein the geographically-dependent elements are associated with a base key of the registry.

37. The system of claim 36, wherein the geographically-dependent elements are associated with a sub key of the base key.

38. The system of claim 31, wherein the geographical resource data store comprises a look-up table.

39. The system of claim 31, wherein the geographically-dependent elements are comprises a file name formatted in the first language.

40. The system of claim 39, wherein the geographical resource data store is accessible by the application to load the file name into the application.

41. A computer-implemented method for configuring a multi-language mobile device to accommodate data variances of geographical regions, the method comprising:

providing an application for generating user interface elements;

configuring the multi-language mobile device to include a language resource data store on the multi-language mobile device, wherein the language resource data store includes a first group of language settings for the user interface elements associated with a first language, and a second group of language settings for the user interface elements associated with a second language, the second language being different than the first language;

configuring the multi-language mobile device to include a geographic resource data store on the multi-language mobile device having geographically specific user interface elements;

requesting a language setting associated with a language;

providing user interface elements in the language;

requesting a geographic specific user interface element; and associating the geographically specific user interface element with the application.

42. The computer-implemented method of claim 41, wherein the geographically specific user interface element is at least one of: a time zone name, daylight savings, and a name of a location.

43. The computer-implemented method of claim 41, wherein the geographically specific user interface element includes the language of the language setting.

44. A computer-readable medium having computer executable instructions for configuring a multi-language mobile device to accommodate data variances of geographical regions, the instructions comprising:
- providing an application for generating geographically neutral user interface elements and geographically dependent user interface elements;
- configuring the multi-language mobile device to include a language resource data store on the multi-language mobile device, wherein the language resource data store includes a first group of language settings for the neutral user interface elements associated with a first language, and a second group of language settings for the neutral user interface elements associated with a second language, the second language being different than the first language;
- configuring the multi-language mobile device to include a geographic resource data store on the multi-language mobile device having the geographically specific user interface elements;
- requesting a language setting associated with a language;
- providing geographically neutral user interface elements in the language;
- requesting a geographic specific user interface element; and
- associating the geographically specific user interface element with the application.

45. The computer-readable medium of claim 44, wherein the geographically specific user interface element is at least one of: a time zone name, daylight savings, and a name of a location.

46. A multi-language mobile device for accommodating data variances among geographical regions, the device comprising:
- a language resource data store on the multi-language mobile device, wherein the language resource data store includes a first group of language settings for user interface elements associated with a first language, and a second group of language settings for user interface elements associated with a second language, the second language being different than the first language;
- a geographic resource data store on the multi-language mobile device, wherein the geographic resource data store includes geographically specific user interface elements;
- an application associated with a display for displaying the user interface elements on a display, wherein the application is configured to:
  - request, from the language resource data store, a language setting associated with a language;
  - display the user interface elements in the language;
  - request, from the geographic resource data store, a geographically specific user interface element; and
  - display the geographically specific user interface elements.

47. The computer-implemented method of claim 46, wherein the geographically specific user interface element is at least one of: a time zone name, daylight savings, and a name of a location.

\* \* \* \* \*